UNITED STATES PATENT OFFICE.

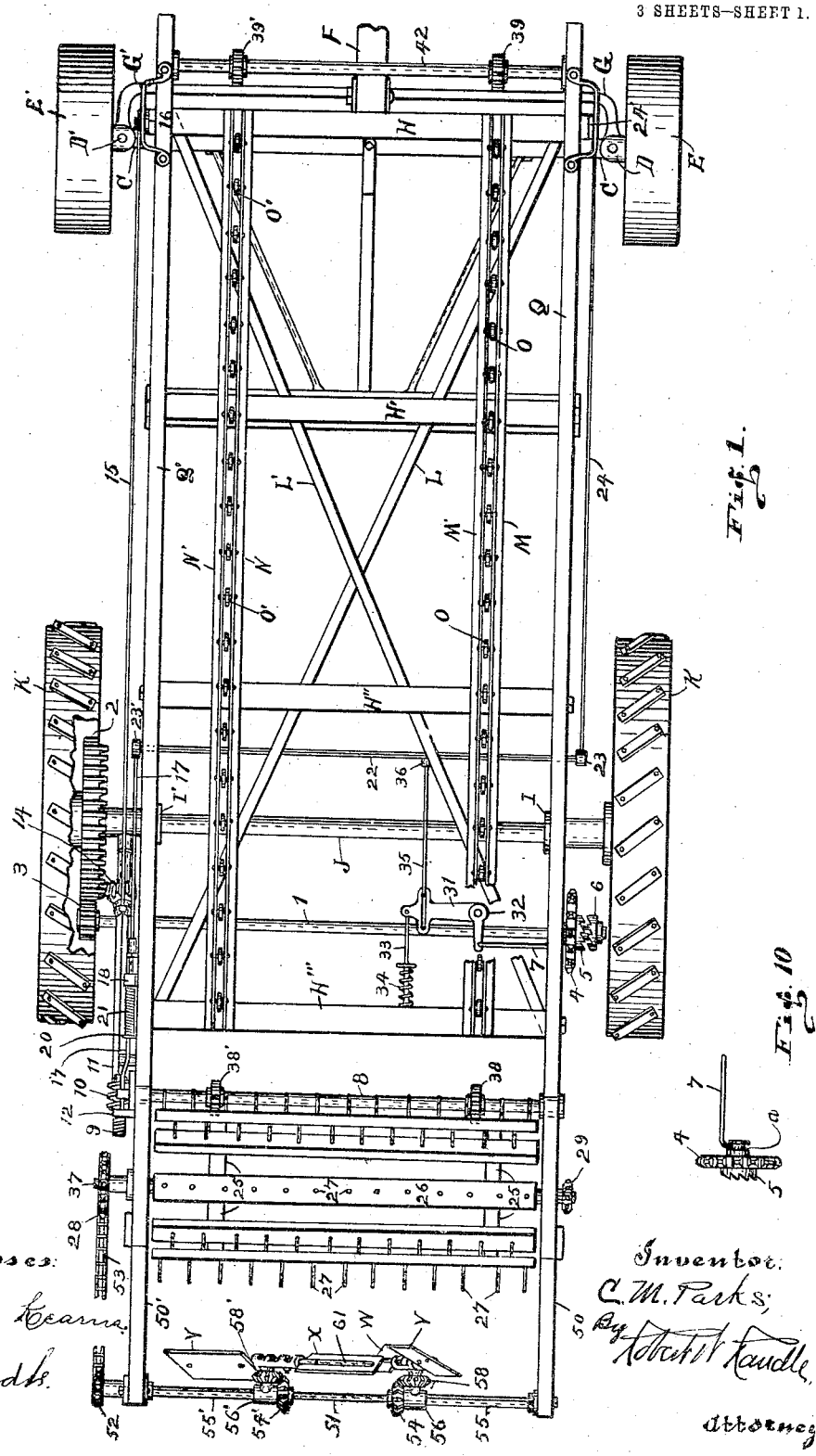

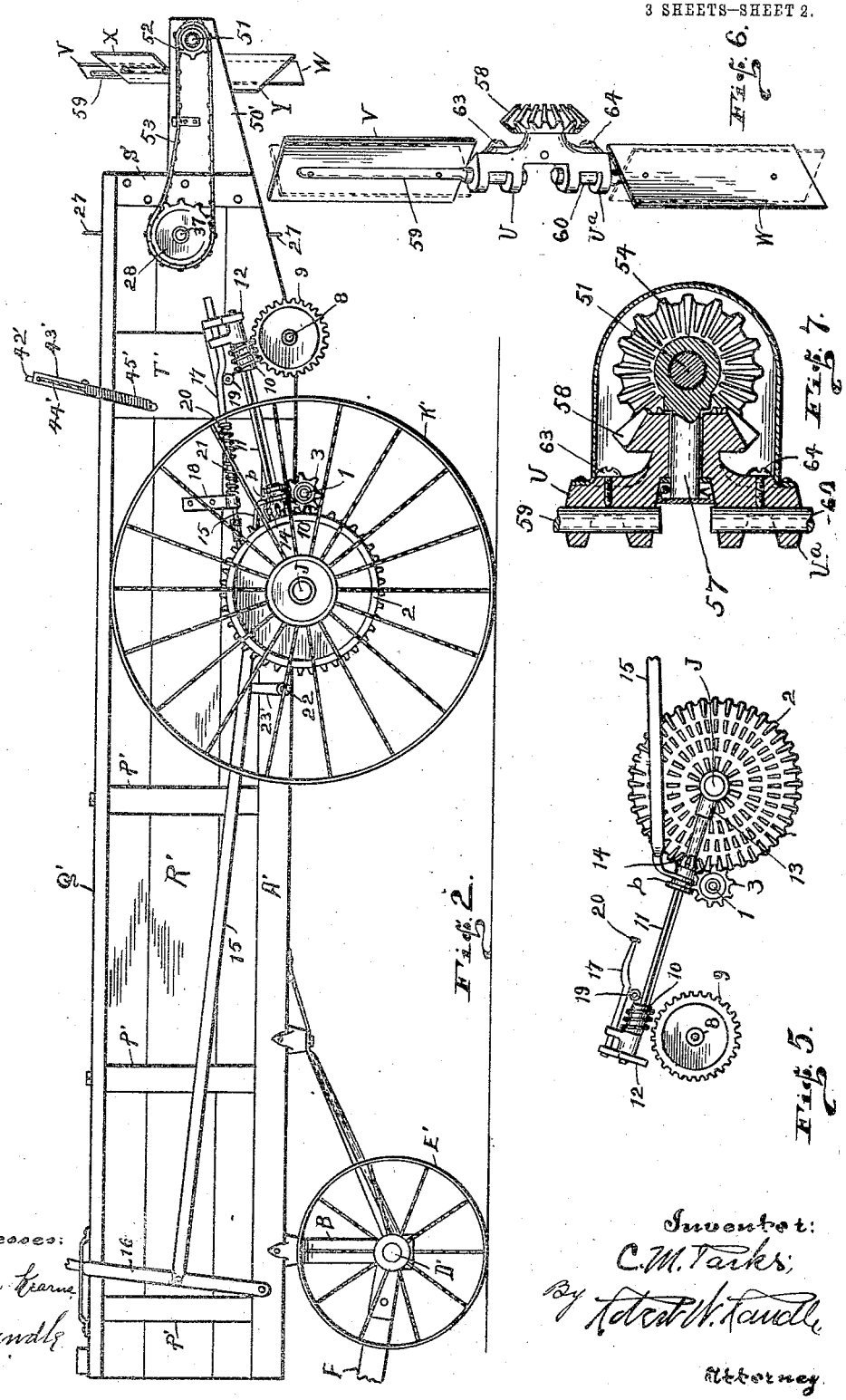

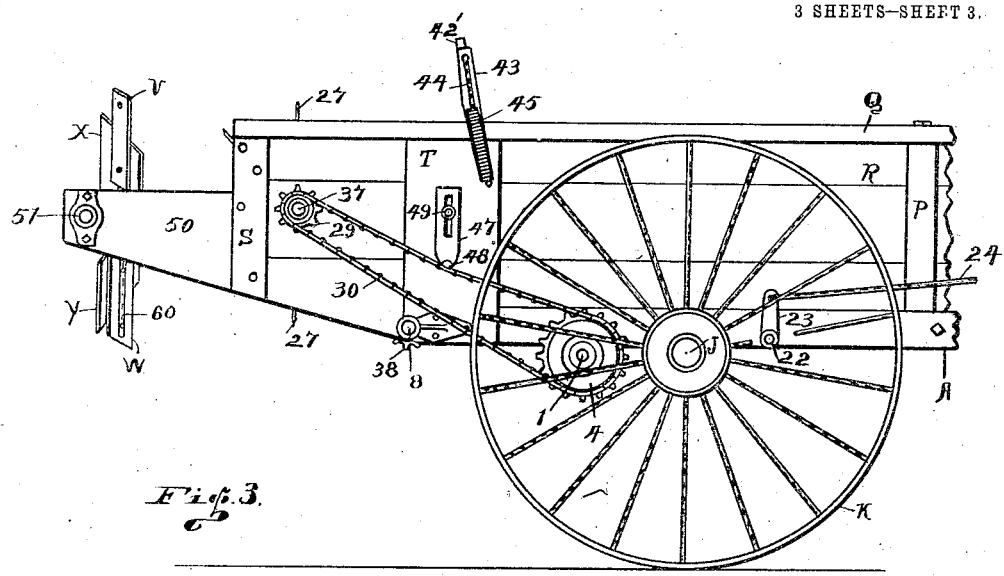

CLINTON M. PARKS, OF WEST MANCHESTER, OHIO.

MANURE-DISTRIBUTER.

1,085,936.  Specification of Letters Patent.  Patented Feb. 3, 1914.

Application filed June 16, 1913. Serial No. 773,914.

*To all whom it may concern:*

Be it known that I, CLINTON M. PARKS, a citizen of the United States, residing in West Manchester, in the county of Preble, in the State of Ohio, have invented certain new and useful Improvements in Manure-Distributers, of which the following is a full, clear, and comprehensive specification and exposition, being such as will enable others to make and use the same with exactitude.

This invention relates to a manure or fertilizer distributer or spreader adapted to carry a load of material and to automatically distribute the same as the machine is driven over the ground, that is, having means whereby the load may be transported by the machine without disturbing the load until the desired distributing point is reached, at which place the machine may be placed in gear with the distributing mechanism, after which it automatically distributes the load over a wide extent laterally.

The object of the invention, broadly speaking, is to provide a fertilizer distributer which will be strong and durable in construction, comparatively light in weight, easily operated and controlled, adapted to be manipulated in a minimum amount of space, and which can be manufactured and sold at a comparatively low price.

More specifically stated, my object is to provide a manure distributer having two distributers, each composed of a plurality of blades, same being mounted in the rear of the discharge and operative at right angles thereto, the two distributers being geared to revolve in directions opposite to each other, same being adapted to receive the fertilizer, as it is discharged by the rotary feed-cylinder, and to break it up and distribute it laterally between and to each side of the track of the machine, and depositing it over a comparatively wide extent on each side of the machine.

The invention lies, more particularly, in the distributing mechanism, the means for operating the same, and the means for changing the angle of the blades thereof in order to meet various conditions.

One manner for carrying out the objects of my invention in a practical manner, and that which in practical operation I have found to be the most mechanically efficient, is shown in the accompanying drawings, in which—

Figure 1 is a plan view of my machine, certain portions being broken away to show parts therebelow, and other parts being omitted in order to show the construction more clearly. Fig. 2 is a left-hand side elevation of my machine complete. Fig. 3 is a right-hand side elevation of the rear portion of my machine. Fig. 4 is a rear elevation of the machine. Fig. 5 is an inner face elevation of the gear changing mechanism. Fig. 6 is an enlarged detail view of a portion of the distributing mechanism. Fig. 7 is an enlarged detail view, partly in section, of a portion of the distributing mechanism. Fig. 8 is a top plan of a portion of the conveyer. Fig. 9 is a bottom plan of a portion of the conveyer. And Fig. 10 is a detail showing the means for placing the clutch in and out of gear.

Similar indices denote like parts throughout the several views.

In order that the construction and the operation of my machine may be more clearly understood and the advantages thereof be more fully appreciated I will now take up a detailed description thereof in which I will set forth the invention as clearly and as comprehensively as I may.

The body of the machine includes the two main sills A and A'. Secured across underneath and connecting the forward portions of said sills is the downwardly extending bracket B which carries the stationary front-axle C therebelow. Connecting the sills A and A' are the four cross bars or sills H. H', H'' and H'''. Pivoted on the ends of the axle C are the stub-spindles D and D', on which latter are revolubly mounted the respective ground guide wheels E and E'.

Letter F denotes the tongue, same being connected to the spindles D and D' by the connecting arms G and G', whereby the front wheels may be turned in order to guide the machine. Mounted in suitable bearings I and I', carried by the sills A and A', is the rear axle or shaft J. Mounted on the ends of shaft J are the comparatively large traction wheels K and K'. The frame thus formed is made more secure by the two braces L and L' which cross each other.

Mounted on top of the sills H, H', H'' and H''' are the two parallel tracks, each being located centerward a short distance from and extending parallel with the sills A and A'. The right-hand track is formed by two angle-bars M and M' with their upwardly extending portions spaced apart and facing each other. In like manner the left hand track is formed by two angle-bars N and N', with their upwardly extending portions spaced apart and facing each other. Revolubly mounted between the bars M and M' are a plurality of rollers O; and in like manner mounted between the bars N and N' are a plurality of rollers O'. Extending up from sill A are a plurality of standards P, which are connected at their upper ends by the top-rail Q, the latter extending parallel with and is directly above the sill A. Also extending up from sill A' are a plurality of standards P', which are connected at their upper ends by the top rail Q', the latter extends parallel with and is directly above the sill A'. Secured to standards P, and closing the spaces between the sill A and the top-rail G, is the side R of the bed, which side extends back even with the end of the rail Q. Secured to the standards P' and closing the spaces between the sill A' and the top-rail Q', is the side R' of the bed, which side extends even with the end of the rail Q'. Extending down from the ends of the respective rails Q and Q' to the lower edges of the sides R and R' are the plates S and S'. Extending from the plates Q and Q' down to the rear ends of the sills A and A', respectively, are the wide plates T and T. It should be observed that at the rear end of the machine the top-rails Q and Q' extend a considerable distance back beyond the rear ends of the respective sills A and A', for the purpose hereinafter made apparent. Extending across the rear portion of the machine and journaled on the under edge of the sills A and A' is the shaft 1. Mounted on the left-hand end of shaft J, between the sill A' and the hub of the traction wheel K', is the master gear-wheel 2. Mounted on the left-hand end of shaft 1 is the pinion 3 which meshes with the periphery of the gear wheel 2, whereby the shaft 1 is revolved continuously as the machine is moved over the ground.

Slidably and revolubly mounted on the right-hand portion of the shaft 1 is the sprocket wheel 4, the outer face of the hub of which is provided with clutch-teeth forming the driven member 5 of the clutch. The drive member 6 of the clutch is rigidly secured to the shaft 1, all as shown in Fig. 1, with the teeth adapted to engage the teeth of the member 5. A channel a is formed around in the inner end of the hub of the wheel 5 in which channel travels the outward L-shaped end of the rod 7. The inner end of rod 7 is pivoted to the bell-crank 31, the latter being pivoted at 32 to a stationary part of the machine. To the inner end of the bell-crank 31 is connected the rod 33 to which is connected the coil-spring 34, the latter having its rear end connected to the bar H''', whereby the sprocket 4 is normally retained to the right, that is with the members 5 and 6 of the clutch in engagement with each other. Extending forward from the bell-crank 31 is the rod 35 which latter is pivoted to the arm 36 which extends from the shaft 22, whereby as the rod 24 is moved forward the clutch 5—6 will be disengaged.

Extending across and mounted on the rear ends of the sills A and A' is the rear feeder or conveyer shaft 8. Secured on the left-hand end of shaft 8 is the gear wheel 9 which is adapted to be engaged by the screw-gear 10. Said screw-gear is mounted on the square shaft 11 whose rear end is rounded to allow it to revolve in the movable bracket 12. Pivoted around shaft J, near the inner face of the wheel 2, is the collar 13 which has a projection in which is a socket to receive the forward end of the shaft 11 which revolves therein. Slidably mounted on shaft 11 is the bevel pinion 14 which is adapted to be engaged with either of the several rows of gear teeth formed around on the inner face of the wheel 2, as shown in Fig. 5. The arm 15 is forked at its rear end, with the forks turned downward and adapted to engage in the channel b formed in the rear extension of the pinion 14, whereby as the lever 16 is moved forward or backward the pinion 14 may be changed from one to the other of the various series of gears on the face of the wheel 2.

Numeral 17 denotes a bar adapted to slide forward and backward in the hanger 18, the latter being secured to the side R'. The rear end of bar 17 is adapted to slide through the loops of the bracket 12, as in Figs. 2 and 5. Forward of the bracket 12 the bar 17 is bent vertically at an angle forming a curved offset as shown. Mounted on the face of the plate T' is a roller 19, over which the lower edge of the bar 17 travels. Said offset in the bar 17 engages the roller 19, whereby if the bar 17 is moved rearward (as in Fig. 2) the screw-gear 10 may engage with the wheel 9, while if the bar 17 be moved forward the gear 10 will be raised up out of mesh with the wheel 9, as in Fig. 5. A collar 20 is secured around the bar 17, and encircling the bar 17, between the hanger 18 and the collar 20, is a coil spring 21 which is adapted to normally retain the gear 10 in mesh with the wheel 9. Extending across through the lower portion of the sills A and A', forward of the shaft J, is the rocker shaft 22. Secured to and extending up from each end of shaft 22 are the arms 23 and 23'. The forward end of the bar 17 is pivoted to the upper end of arm 23'. Pivoted to the upper end of arm 23 and extending forward therefrom is the bar 24, with its forward end connected to a lever 24' whereby the bar 24 may be moved forward and backward, in order to place the feed or conveyer into and out of operation.

Numeral 37 denotes the cylinder shaft, same extends across the machine forward of the plates S and S'. Mounted on said shaft 37 is the cylinder, which comprises: the disks 25 and 25'. Secured on the peripheries of said disks are a plurality of slats 26, and extending out from each of said slats is a plurality of teeth 27. Secured on the left-hand end of shaft 37 is the sprocket-wheel 28, and on the right-hand end of the same shaft is secured the sprocket wheel 29. The sprocket wheel 29 is connected to the sprocket-wheel 4 by the sprocket-chain 30, shown in Fig. 3, whereby the cylinder is revolved. Extending back from the plates S and S' are the respective projections 50 and 50'. Extending across and mounted in suitable bearings carried by the rear portions of the projections 50 and 50' is the distributer shaft 51. Secured on the left-hand end of shaft 51 is the sprocket-wheel 52 which is connected to the sprocket-wheel 28 by the sprocket-chain 53. Secured on shaft 51, near its central portion, and spaced from each other, are the two miter pinions 54 and 54'. Indices 55 and 55' denote the two tubular sleeves surrounding shaft 51, and they extend from the respective miter pinions 54 and 54' to the inner faces of the respective projections 50 and 50' to which they are rigidly secured. Rigidly secured around the inner ends of the sleeves 55 and 55' are the T-shaped fittings 56 and 56', respectively.

A stem 57, shown in Fig. 7, extends back from each of the fittings 56 and 56' on each of which is mounted a miter-pinion 58 and 58', right and left respectively. Formed integral with each of the pinions 58 and 58' is a pair of yoke clamps, as the clamps U—U$^a$ on the right, with corresponding clamps on the left. The members of each pair of clamps are oppositely disposed with relation to each other and they are arranged at right angles with relation to the machine.

Each of the clamps, U, U$^a$, on the right and corresponding clamps on the left, is adapted to carry a blade V, W, X and Y, respectively. Each of said blades is formed of an oblong piece of sheet metal, each being provided with a stem, 59, 60, 61 and 62, respectively, secured centrally and extending longitudinally thereof, projecting therebeyond at one end and adapted to fit in its aperture of the respective clamps U, U$^a$, where they are adjustably secured by their respective set-screws 63, 64.

It should be noticed that each pair of blades is so geared that they will overlap the path of the other pair, yet without danger of interference between the two pairs of blades, and that each pair of blades operate in a direction opposite to that of the other, and also that the upward movements of both pair of blades is in the center, their downward movements being outside. It should also be noticed that each of the four blades is adapted to have its angle of inclination changed as desired, each independent of the others, in order to meet various conditions.

The bottom of the bed formed by the sides R and R' is movable, being in the nature of an endless conveyer, formed by two sets of chains 40 and 40' which connect the slats 41. Chain 40 is adapted to travel over the rollers O, turning at the rear on the pinion 38, and at the front on the pinion 39; and the chain 40' travels over the rollers O', turning at the rear on pinion 38' and at the front on the pinion 39', the pinions 39 and 39' being mounted on the front conveyer-shaft 42. The slats 41 are of a length to allow them to move between the sills A and A'.

The rake comprises the rotary bar 42', which is pivoted between the upper ends of the standards 43 and 43'. The inner ends of the levers 44 and 44' are secured to the bar 42', pass outward each through an aperture formed through the upper ends of the respective standards 43 and 43', and then extend downward. Secured to the lower ends of the levers 44 and 44' are the respective springs 45 and 45', the lower ends of said springs being secured to the lower ends of the respective standards 43 and 43'. Extending downward from the bar 42' are a plurality of teeth or prongs 46. Connected to the face of the plate T is a vertically adjustable block 47 which has an outwardly extending finger 48 which is adapted to engage the chain 30 by which means said chain may be tightened, said block 47 being secured by the bolt 49.

In practice the machine is adapted to travel over the ground as an ordinary vehicle. The bed may be loaded with material to be distributed, and conveyed thereby to where it is desired to distribute the material. When being so conveyed the lever 16 should be moved back to its limit, and the lever 24' should be moved forward, thereby placing the various mechanisms out of commission. When it is desired to distribute the material then the lever 24' is moved rearward, thereby placing the gear 10 in mesh with wheel 9, which will start the conveyer to operate over the rollers O and O', carrying the material to the rear. It will also be apparent that as the lever 24' is moved forward that the sprocket wheel 4 will be drawn inward, thereby disengaging the clutch 5—6, and that when said lever 24' is moved back the clutch will be engaged, thereby causing the wheel 4 to revolve the cylinder, and also by means of the sprocket wheels 28 and 52 the distributer shaft 51 will be revolved. Simultaneously with the above the lever 16 should be moved forward thereby causing the pinion 14 to engage in the outer row of gears of the wheel 2, as shown in Fig. 5. And afterward the lever 16 may be moved farther forward to cause the pinion 14 to engage another row of gears on the wheel 2, depending on the speed at which it is desired to have the depending mechanisms travel. Suppose now that the machine is in gear as above set forth, and that it is traveling forward over the ground: The conveyer will carry the material rearward, the rake preventing the material from moving in too great a bulk and also equalizing and evening the load. As the material engages the cylinder it will be broken up and thrown up and back thereover. Now as the material leaves the cylinder the blades of the distributer, which revolve at great speed, will set up conflicting air currents which will throw the material to the right and the left beyond the machine for a considerable distance, and in such manner as to cause the material to be evenly distributed between the two extremes of its movements right and left.

By reason of the construction and the peculiar operation of the distributing mechanism it is evident that a comparatively wide swath is distributed, thereby requiring fewer trips of the machine and less damage to soil that has heretofore been attained by machines for this purpose. And in addition to the above the material is more finely broken up and more evenly distributed than has heretofore been possible.

It should be understood that various changes may be made in the details of construction, from that herein set forth, without departing from the spirit of my invention and without sacrificing any of the advantages thereof.

Having now fully shown and described my invention, what I claim, and desire to secure by Letters Patent of the United States, is—

1. A manure distributer comprising a frame mounted on ground wheels and adapted to carry a load of material, a conveyer forming the floor of the machine bed, means for placing the conveyer into and out of gear with relation to the movements of the machine in carrying the load, a cylinder mounted across the machine in the rear of the conveyer and adapted to receive the material from the conveyer, a distributing mechanism, mounted in the rear of the cylinder and comprising sets of blades revoluble at right-angles to the machine and in directions opposite to each other, each set of blades being geared to overlap the path of the set next thereto, means whereby the angle of inclination of each blade may be changed, and means for placing the distributer mechanism into and out of gear with relation to the movements of the machine as it travels over the ground.

2. The combination with the body of the machine having a conveyer and a cylinder mounted at the rear end of the conveyer, a distributer located in the rear of the cylinder and comprising a shaft, a pair of miter gears spaced apart and secured to said shaft, sleeves surrounding the said shaft and each extending from one of said miter gears to the respective sides of the machine to which they are rigidly secured, a fitting carried by the inner end of each sleeve, a miter gear mounted on each fitting and meshing at right-angles with its respective first named miter gear, a pair of clamps formed integral with each of the second named miter gears, a stem adjustably secured in each of said clamps, and a blade carried by each of said stems, all substantially as shown and described.

3. In combination with a manure spreader, a distributing mechanism comprising a shaft therefor, means for rotating the shaft, a pair of nonrotatable sleeves surrounding the outer portions of said shaft, a miter gear wheel secured on said shaft adjoining the inner end of each sleeve, a fitting secured to the inner end of each sleeve, a miter gear wheel revolubly mounted on each fitting and located at right angles to and meshing with the respective first named miter gear wheels, a pair of oppositely directed clamps carried by each of the second mentioned miter gear wheels, a stem revolubly adjustable in each of said clamps, means for securing each of said stems in adjusted position, and a blade secured to each of said stems, all substantially as shown and described.

In testimony whereof I have hereunto subscribed my name to this specification in the presence of two subscribing witnesses.

CLINTON M. PARKS.

Witnesses:
R. E. RANDLE,
ROBT. W. RANDLE.